April 2, 1963 W. NEILSON 3,083,426
TOGGLE FASTENERS

Filed Nov. 7, 1960 2 Sheets-Sheet 1

INVENTOR
William Neilson
BY
Lucke & Lucke
ATTORNEY

United States Patent Office 3,083,426
Patented Apr. 2, 1963

3,083,426
TOGGLE FASTENERS
William Neilson, Hillington, Glasgow, Scotland, assignor to K.A.C. Limited, Glasgow, Scotland, a British company
Filed Nov. 7, 1960, Ser. No. 67,844
Claims priority, application Great Britain Nov. 19, 1959
6 Claims. (Cl. 24—68)

This invention concerns toggle fasteners adapted for securing together members (e.g. two parts of an aircraft engine or other cowling, a removable panel and its supporting structure, fairings and the like) which are, when released, movable away from one another.

Toggle fasteners for the aforesaid purposes generally comprise a primary part adapted to be carried by one of the members to be secured by the fastener, and a secondary part adapted to be carried by the other of the members, a locking lever and link arrangement being provided to draw the primary and secondary parts together by rocking of the lever about a fulcrum on the secondary part towards a locking position in which the lever and link are in an overcentre condition so that tension tending to separate the fastener parts acts to maintain the lever in its locking position. Usually the link is pivotally secured to the primary part and to the locking lever between the ends of the latter, whilst the locking lever has an end adapted for detachable pivotal connection with the fulcrum to permit complete separation of the fastener parts.

When such fasteners are intended for installation with the parts thereof flush with the front surfaces of the members to be secured thereby, the edges of said members have to be provided with cut-outs or recesses to accommodate the link when the fastener is locked, and since in many situations, particularly in aircraft installations, the members to be secured together achieve much of their strength and rigidity from stiffening beads, flanges, ribs or other elements extending along their edges, the presence of cut-outs and recesses in such edges can seriously weaken the members and necessitate the provision of additional structure in the vicinity of the fasteners to restore to the members the loss of strength due to the cut-outs or recesses. This usually results in excessive structure weight or other structural inefficiency.

An object of the present invention is to provide a toggle fastener especially suitable for such purposes as are mentioned above and which may be installed with its front surface flush with the surface of the members to be secured by the fastener and with little or no weakening of the adjacent edge portions of the members.

More particularly, an object of the present invention is to provide improvements in and modifications of the toggle fasteners disclosed in the specification of Paterson U.S. Patent No. 2,945,274, such improvements and modifications simplifying the construction of the fasteners and enhancing their operational reliability.

Thus, in the aforesaid specification there is described and claimed, inter alia, a toggle fastener for securing two members together comprising a recessed housing adapted to be carried by a first of said members with its front face flush with the front surface of said first member, a locking lever pivoted adjacent one of its ends to said housing and rockable between a locking position in which the front surface of said lever lies flush with the front face of said housing to partially close the recess therein and an unlocked position in which the free end of said lever projects forwardly from said recess, a link pivoted at one of its ends between the ends of said lever and adapted to be positioned in said recess, a connecting member articulated to the other end of said link adapted to be reciprocated by rocking said lever, said connecting member being provided with a hooked extremity extending from an end of said housing for engagement with a complementary element carried by the second of said members, guide slot means disposed on said connecting member, a guide pin mounted on said housing and positioned in said slot means, said slot means being shorter than the longitudinal distance moved by the axis of articulation between said link and said connecting member during rocking of said lever between its locking and unlocked positions and being disposed parallel to and spaced from the reciprocal line of said axis to cause said connecting member to swing about said pin during such rocking of said lever, said lever when rocked from its unlocked to its locking position swinging said hooked extremity into engagement with said element and thereafter drawing said extremity toward said housing wherein said lever and said link pass overcenter as said lever approaches its locking position.

In the embodiment disclosed in the aforesaid specification, the said swinging of the hook-like extremity of the connecting member, during movement of the locking lever towards its locking position, is brought about by pin and slot means co-operating with the connecting member and the housing, these means including a slot aligned with the desired direction of movement of the connecting member after swinging thereof and having a length less than the distance moved in the said direction by the end of the link articulated to the connecting member for the whole rocking travel of the locking lever, while the link is articulated to the connecting member at a position offset from the pin and slot means. To ensure that swinging of the connecting member and longitudinal movement thereof occurs, respectively, during the appropriate portions of the travel of the locking lever towards its locking position, resilient biasing means are set on the connecting member to oppose longitudinal movement thereof until swinging has occurred, about the axis of the pin of such means, and the connecting member has reached the attitude, relatively to the housing, in which the longitudinal movement is to take place.

It has been found in practice that, because the movement of the connecting member is not positively controlled during the travel of the locking lever and the initial swinging of the connecting member upon movement of the locking lever from its unlocked to its locking position results from a resilient bias acting on the connecting member as explained above, there is a risk that if the swinging of the connecting member is impeded, for instance by failure of its hook-like extremity to swing into proper engagement with the complementary element, longitudinal movement of the connecting member can occur before the full swinging movement of the connecting member has been completed with the result that the locking lever may be moved to its locking position and the fastener appear to be locked without, however, the complementary element being engaged by the connecting member.

A primary object of the present invention is to modify a fastener, as disclosed in the aforesaid specification, in such manner that full swinging movement of the connecting member, prior to longitudinal movement thereof during movement of the locking lever towards its locking position, is assured.

Thus, a toggle fastener in accordance with the present invention comprises a recessed housing adapted to be carried by one of two members to be secured together by the fastener with its front flush with the front surface of such member; a locking lever pivoted near one of its ends to said housing and rockable between a locking position, in which its front surface lies flush with the front of the housing and closes part of the recess therein, and an unlocked position, in which the free end of the lever projects forwardly out of the housing recess; a link pivoted at one of its ends to said locking lever; a connecting member articulated to the other end of said link, such member being rockable about an axis parallel with the pivoting axis of said locking lever and movable longitudinally with respect of the housing and having a hook-like extremity extending from an end of the housing for engaging a complementary element on or adapted to be carried by the second of said two members; and co-operating guide means on said housing and said connecting member at a position displaced from said rocking axis for the connecting member and so arranged that relative movement between the connecting member and said housing as a result of rocking of said locking lever from its unlocked to its locking position is positively restrained or confined to a path in which said connecting member extremity first swings in the direction of its mouth and thereafter moves towards the housing, the locking lever and link passing over-centre as the locking lever approaches its locking position.

In the embodiment disclosed in the aforesaid specification, the link works in tension and in a fastener in accordance with the present invention the link may likewise work in tension. However, in accordance with a further feature of the present invention, the link may be articulated to the connecting member and to the locking lever in such manner as to work in compression, since, in this way, the overall length of the fastener may be reduced.

Moreover, in the embodiment disclosed in the aforesaid specification, the locking lever is formed in two parts, viz. a locking lever proper and an extension lever articulated to the free end of the latter for restricted angular movement relatively thereto, so that it may be rocked, when the locking lever is in its locking position, to an opening position in which such extension lever projects forwardly to be grasped by the hand of the operator to enable the latter effectively to use his strength in pulling the locking lever proper and link over-centre to rock the locking lever proper to its unlocked position. A similar arrangement may be adopted in a fastener in accordance with the present invention, although in accordance with another feature of the invention the locking lever may be formed in two parts having a common pivotal connection with the housing and extending adjacent to one another from such common pivotal connection, one of these parts constituting the locking lever proper and being articulated to the link and the other, preferably longer, part constituting an extension lever which may be grasped by the operator, these two locking lever parts being so interconnected that they may rock independently to a predetermined extent about their common pivotal connection with the housing, whereby, when the locking lever as a whole is in its locked position, the extension lever part of such locking lever may be rocked independently to an opening position in which it may be easily grasped by an operator for further rocking to pull the first part and the link over-centre.

As in the case of the embodiment disclosed in the aforesaid specification, a fastener in accordance with the present invention may include latch means for securing the locking lever in its said locked position and, if desired, operation of the latch means to release the locking lever may be effective to cause initial movement of the latter towards its unlocked position. If the locking lever includes a part constituting an extension lever, such latch means may co-operate with the latter and release of the latch means may be effective to cause movement of such extension lever towards its opening position.

In order that the invention may be fully understood, an embodiment thereof will now be described by way of example and with reference to the accompanying drawings, in which.

Figure 1:
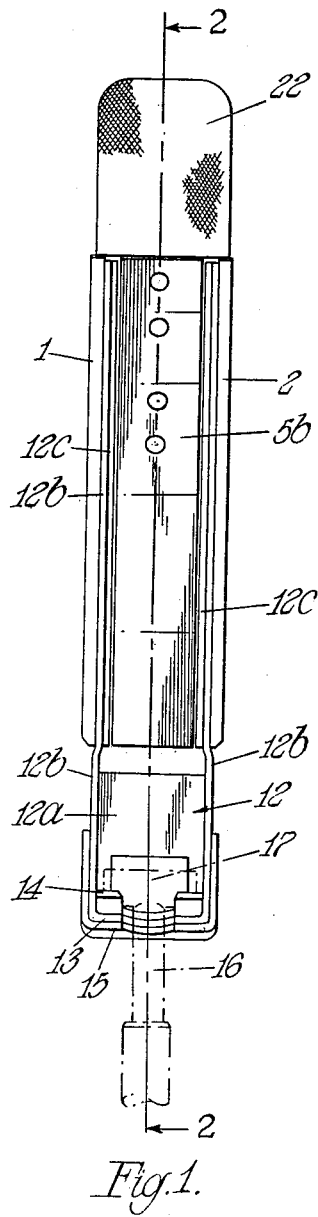
FIGURE 1 is a front elevational view of a toggle fastener in accordance with the invention, showing the fastener in locked condition.

The toggle fastener shown in the drawings comprises a recessed housing constituted by a pair of spaced parallel side plates 1, 2 united by tubular spacer elements 3, 4 at locations towards the rear of the recess defined between the side plates 1, 2. The housing is adapted for attachment to one of two separable members to be secured by the fastener, in a cut-out or recess in such member, so that the front edges of the side plates 1, 2 are flush with the front surface of the member. For securing the housing to such member, bolts or other like elements may be employed, such bolts conveniently extending through the housing in the bores of the tubular spacer elements 3, 4. If the fastener is to be used on a curved member, then, as shown, the side plates 1, 2, or at least the front edges thereof, may have curvature to match that of such member.

Figure 2:
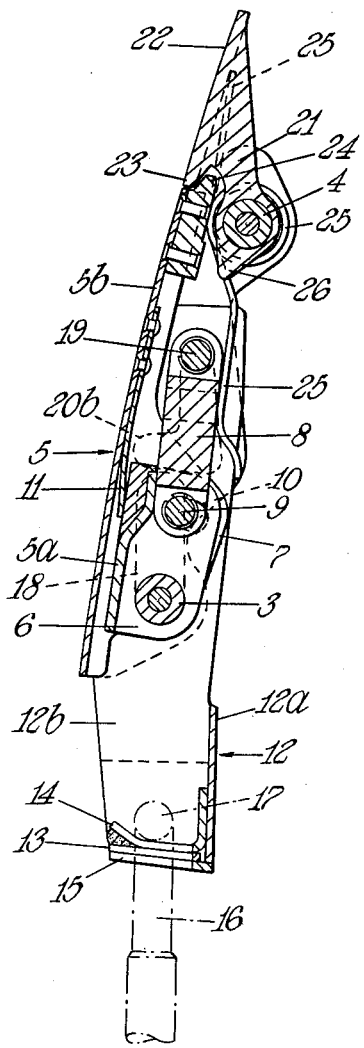
FIGURE 2 is a longitudinal sectional view, taken on line II—II of FIGURE 1.
Figure 3:
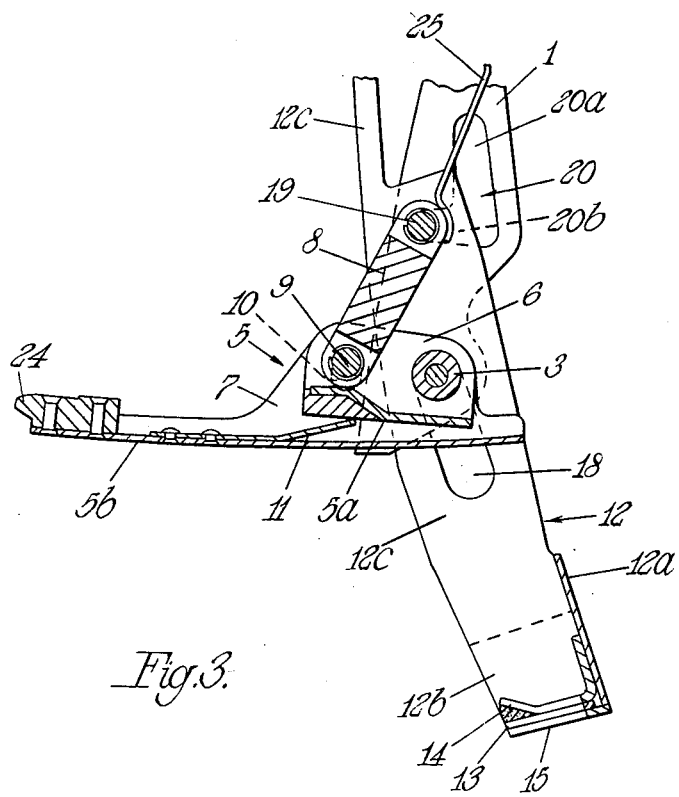
FIGURE 3 is a fragmentary longitudinal sectional view corresponding with part of FIGURE 2 but showing the unlocked condition of the fastener parts.

The fastener further comprises a two-part locking lever 5 including a first part 5a having a pair of rearwardly extending side cheeks 6 and pivoted near one of its ends to the housing by means of a transverse pivot constituted by the spacer element 3 and passing through aligned apertures in said side cheeks 6. This locking lever part 5a is thus rockable about the axis defined by the spacer element 3 between a locking position shown in FIGURES 1 and 2 and in which its front surface lies within the recess and generally parallel with the front edges of the housing side plates, and an unlocked position, shown in FIGURE 3 and in which its free end projects forwardly out of the housing recess.

An extension lever 5b constituting the second part of the locking lever and having a pair of rearwardly extending side cheeks 7 near one of its ends is also pivoted to the housing by means of the spacer element 3, the side cheeks 7 of the extension lever 5b straddling the first part 5a of the locking lever and extending adjacent to the outer faces of the side cheeks 6 of the latter, the spacer element 3 passing through aligned apertures in the extension lever side cheeks 7 as well as through the aforesaid apertures in the locking lever first part side cheeks 6. Thus, the two parts 5a, 5b of the locking lever have a common pivotal connection to the housing constituted by the spacer element 3.

A link 8 is pivoted to the locking lever first part 5a near the free end thereof, this link 8 being disposed between the side cheeks 6 of such locking lever part and being transfixed by a pivot pin 9 which extends through aligned apertures in the side cheeks 6 and projects into slots 10 in the side cheeks 7 of the extension lever 5b, such slots 10 in the extension lever side cheeks 7 having centre lines which are arcs of circles centred in the axis of the common pivotal connection of the two parts of the locking lever with the housing. Thus, the link pivot pin 9 also forms a connection between the locking lever parts 5a, 5b, this connection permitting limited relative angular movement between the two locking lever parts. A leaf spring 11 on the inner face of the extension lever 5b engages the locking lever first part 5a and urges the latter away from the extension lever 5b.

A channel section connecting member 12 is located within the housing recess with one end projecting beyond the corresponding end of the housing, this end of the connecting member 12 being closed by an end flange 13 and internal and external doubling plates 14, 15, the end flange 13 and the doubling plates 14, 15 being notched so as to admit the shank of a T-bolt 16, which constitutes the complementary element of the fastener, between the limbs of the connecting member, whereby the head 17 of this T-bolt may be retained by the internal doubling plate 14 against withdrawal of the T-bolt longitudinally from the end of the connecting member. The internal doubling plate 14 curves forwardly and away from the end of the connecting member to form a hook-like seat for each side of the T-bolt head 17; thus this end of the connecting member 12 constitutes a split hook-like extremity for co-operation with the T-bolt head.

That part of the connecting member 12 within the housing has its web 12a cut away and its flanges 12b stiffened by internal doubling plates 12c which, with the flanges straddle the side cheeks 6, 7 of the two parts of the locking lever so as to lie between the extension lever side cheeks 7 and the side plates 1, 2 of the housing. The spacer element 3 forming the common pivotal connection between the locking lever parts 5a, 5b and the housing extends through the flanges 12b and doubling plates 12c of the connecting member 12 in longitudinal slots 18 in such flanges and doubling plates, so that the connecting member 12 is rockable about the spacer element 3 and also movable longitudinally of itself with respect to the housing.

Near its end remote from said hook-like extremity, the connecting member 12 is pivotally connected to the link 8 by means of a pivot pin or slide 19 that passes through the link and through aligned apertures in the connecting member flanges 12b. The arrangement is such that, when the locking lever first part 5a is in its locking position, as defined above and shown in FIGURES 1 and 2, such locking lever part 5a and the link 8 lie in a substantially straight line with the pivot pin 9, coupling the link 8 to the locking lever part 5a, situated between the spacer element 3 and the pivot pin 19, coupling the link 8 to the connecting member 12, with, however, the axis of the pivot pin 9 situated slightly to the rear of the plane containing the axis of the spacer element 3 and the axis of the pivot pin 19. That is, the toggle constituted by the locking lever first part 5a and the link 8 goes over-centre during the final travel of the locking lever first part 5a into its locking position, so that tension loads applied to the connecting member 12 by the T-bolt 16 act to hold the locking lever first part 5a in its locking position.

The pivot pin 19, coupling the link 8 to the connecting member 12, extends beyond the outer face of each connecting member flange 12b and into V-shaped guide slots 20 in the housing side plates 1, 2. These guide slots 20 are generally L-shaped, the "stem" 20a of the L being substantially aligned with the longitudinal axis of the housing and the "foot" 20b of the L extending forwardly from the end of the "stem" 20a nearer the spacer element 3.

The effect of said guid slots 20 and the pivot pin 19 projecting thereinto is to determine the path followed by the corresponding end of the connecting member 12 during rocking of the locking lever first part 5a between its locking and unlocked positions. When the locking lever part 5a is in its locking position (FIGURES 1 and 2), the pivot pin 19 has its ends located near the ends of said slots 20 remote from the forwardly extending portions 20b thereof, so that rocking of the locking lever part 5a towards its unlocked position results in pivot pin 19 following the "stem" portions 20a of the guide slots 20 with corresponding longitudinal movement of the connecting member 12 relatively to the housing. As the locking lever part 5a approaches its unlocked position (FIGURE 3), the pivot pin 19 moves into the forwardly extending portions 20b of the guide slots 20, so that the corresponding end of the connecting member 12 is caused to move forwardly as the locking lever part 5a completes its travel, the connecting member 12 rocking about the spacer element 3. Thus, the travel of the locking lever part 5a to its unlocked position results first in longitudinal displacement of the connecting member 12 and then rocking of the latter to swing its hook-like extremity rearwardly.

Conversely, upon rocking of the locking lever part 5a towards its locking position, the connecting member 12 is first rocked, by the thrust in the link 8, to swing its hook-like extremity forwardly moving the pivot pin 19 downwardly until it enters and moves upwardly in the "stem" portions 20a of the guide slots 20 and is permitted to move upwardly therein and longitudinally of the housing for corresponding longitudinal movement of the connecting member 12.

Thus it will be seen that the fastener construction, as so far described, provides positive guidance for the movement of the connecting member 12 during travel of the locking lever part 5a between its locking and unlocked positions.

Although the fastener, as so far described, has no tendency to become released under tension loads acting on the connecting member when the locking lever part 5a is in its locking position, the fastener preferably includes latch means precluding rocking of the locking lever out of its locking position without deliberate release of such latch means, thereby to avoid inadvertent release of the fastener under varying loads and inertia forces set up, for instance, by vibration.

Thus in the illustrated embodiment, a latch lever 21 is pivoted on the spacer element 4, the latch lever 21 carrying a latch plate 22 which lies flush with the corresponding end portions of the front edges of the side plates 1, 2 and closes the corresponding part of the housing recess. The latch plate 22 is formed with a latch nose 23 adapted to engage over a complementary projection 24 at the end of the extension lever 5b when the latter is aligned with the front edges of the housing side plates, i.e. when the two parts 5a, 5b of the locking lever are in their locking position, as defined above and shown in FIGURES 1 and 2. It should be noted that, for this position of the extension lever 5b, the pivot pin 9 coupling the link 8 to the locking lever first part 5a engages the forward ends of the arcuate slots 10 in the extension lever side cheeks 7, so that retention of the extension lever 5b in the aforesaid locking position also retains the locking lever first part 5a in its locking position.

The latch plate 22 is urged forwardly of the housing by means of a hairpin spring 25 having a coil surrounding the spacer element 4 and one end engaging the rear of the latch plate 22 and its other end extending beneath the link 8 to engage the pivot pin 9. The arrangement of the latch nose 23 and the complementary projection 24 on the extension lever 5b is such that the latch plate 22 has to be depressed rearwardly into the housing, causing corresponding rocking of the latch lever 21, to effect release of the extension lever 5b. When the extension lever 5b is released, the leaf spring 11, acting between the extension lever 5b and the first part 5a of the locking lever, acts to rock the free end of the extension lever 5b outwardly of the housing recess to facilitate its being grasped by the operator, but to ensure such movement of the free end of the extension lever 5b outwardly of the housing recess, the latch lever 21 has an ejector arm 26 which, on movement of the latch plate 22 into the housing recess, swings forwardly within the latter to strike the rear of the extension lever 5b and to project its free end out of the housing recess.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

I claim:

1. A toggle fastener for securing two members together, said fastener comprising a recessed housing adapted to be carried by a first of such members with its front face flush with the front surface of such first member, a locking lever pivoted adjacent one of its ends to said housing and rockable between a locking position in which the front surface of said lever lies flush with the front face of said housing to partially close the recess therein and an unlocked position in which the free end of said lever projects forwardly from said recess, a link pivoted at one of its ends between the ends of said lever and adapted to be positioned in said recess, a connecting member articulated to the other end of said link adapted to be reciprocated by rocking said lever, said connecting member being provided with a hooked extremity extending from an end of said housing for engagement with a complementary element carried by the second of such members, co-operative guide means disposed on said housing and on said connecting member, said guide means comprising a V-shaped guide slot and a slide moving in said guide slot in response to relative movement between said connecting member and said housing, said guide slot being positioned in said housing in such manner that said slide attached to said connecting member in moving from an unlocked to a locking position has to move downwardly and upwardly in said slot to positively confine movement of said connecting member relative to said housing to complete a forward swing of said hooked extremity toward engagement with such complementary element before allowing said connecting member to move longitudinally toward said housing when said locking lever is rocked from its unlocked to its locking position, wherein said locking lever and said link pass over-center as said lever approaches such locking position.

2. A toggle fastener according to claim 1 wherein said housing is provided with two lateral walls defining said recess, each of said walls is provided with one of said guide slots, the opposite ends of said slide being mounted in said slots to form a transverse pivot pin coupling said link to said connecting member.

3. A toggle fastener according to claim 1 in which said lever comprises a first and a second part, said first and second parts being articulated to said link and said second part articulated to said first part to form an extension lever for restricted rockable movement relative to said first part.

4. The toggle fastener of claim 3, in which said locking lever first part and second part have a common pivotal connection to the housing, said second part being rockable independently of said first part to a restricted extent to enable its free end to project from said housing while said first part is in its locking position.

5. A toggle fastener according to claim 4 in which said first and said second lever parts have adjacent side checks, arcuate slots are disposed in the cheeks of said second part and a second transverse pivot pin articulates said link to said first part, said second pin extending through said first part into said arcuate slots, said arcuate slots determining the extent of such rocking of said second part relative to said first part.

6. A toggle fastener according to claim 5 including latch means, said latch means cooperating with said second part to releasably retain said lever in such locking position.

References Cited in the file of this patent

UNITED STATES PATENTS

| | | |
|---|---|---|
| 845,349 | Giles et al. | Feb. 26, 1907 |
| 2,427,603 | Higgins | Sept. 16, 1947 |
| 2,873,495 | Love | Feb. 17, 1959 |
| 2,945,274 | Paterson | July 19, 1960 |

FOREIGN PATENTS

| | | |
|---|---|---|
| 715,159 | Great Britain | Sept. 8, 1954 |